United States Patent
Malmin

(10) Patent No.: US 10,866,329 B2
(45) Date of Patent: Dec. 15, 2020

(54) SYSTEM AND METHOD TO UNPILE OVERLAPPING PULSES

(71) Applicant: Siemens Medical Solutions USA, Inc., Malvern, PA (US)

(72) Inventor: Ronald E. Malmin, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 163 days.

(21) Appl. No.: 16/092,929

(22) PCT Filed: Jun. 2, 2017

(86) PCT No.: PCT/IB2017/053265
§ 371 (c)(1),
(2) Date: Oct. 11, 2018

(87) PCT Pub. No.: WO2018/002744
PCT Pub. Date: Jan. 4, 2018

(65) Prior Publication Data
US 2019/0170882 A1  Jun. 6, 2019

Related U.S. Application Data

(60) Provisional application No. 62/356,453, filed on Jun. 29, 2016.

(51) Int. Cl.
*G01T 1/17* (2006.01)
*G01T 1/161* (2006.01)
*G01T 1/166* (2006.01)

(52) U.S. Cl.
CPC ............ *G01T 1/171* (2013.01); *G01T 1/1617* (2013.01); *G01T 1/1663* (2013.01)

(58) Field of Classification Search
CPC ...... G01T 1/1617; G01T 1/1663; G01T 1/171
See application file for complete search history.

(56) References Cited

U.S. PATENT DOCUMENTS 3,011,057 A    11/1961  Anger
4,221,967 A  *  9/1980  Wang .................... G01T 1/1642
                                                        250/214 VT (Continued)

FOREIGN PATENT DOCUMENTS

WO    2010080046 A2    7/2010
WO    2012101332 A1    8/2012

OTHER PUBLICATIONS

International Search Report for corresponding application No. PCT/IB2017/053265 dated Aug. 25, 2017.

*Primary Examiner* — Dani Fox
*Assistant Examiner* — Soorena Kefayati

(57) ABSTRACT

A system includes reception of an a electrical signal from a light sensor, determination of a first integral over a first number of samples of the electrical signal, determination of an estimated energy of a first pulse based on the first integral, where the electrical signal includes the first pulse and a second pulse, where a portion of the second pulse overlaps a portion of the first pulse, determination of a second integral over a second number of samples of the electrical signal, determination of a second estimated energy of the first pulse over the second number of samples, determination of a residual short integral based on the second integral and the second estimated energy, and determination of an estimated energy of the second pulse based on the residual short integral.

18 Claims, 16 Drawing Sheets

(56) References Cited

U.S. PATENT DOCUMENTS

| | | | | | |
|---|---|---|---|---|---|
| 4,535,242 A * | 8/1985 | Dirkse | | G01T 1/17 | |
| | | | | 250/363.02 | |
| 4,546,255 A * | 10/1985 | Knoll | | G01T 1/1642 | |
| | | | | 250/369 | |
| 5,210,423 A * | 5/1993 | Arseneau | | G01T 1/17 | |
| | | | | 250/362 | |
| 5,774,522 A * | 6/1998 | Warburton | | G01T 1/171 | |
| | | | | 250/370.06 | |
| 6,291,825 B1 * | 9/2001 | Scharf | | G01T 1/1648 | |
| | | | | 250/363.02 | |
| 6,362,478 B1 * | 3/2002 | McDaniel | | G01T 1/171 | |
| | | | | 250/361 R | |
| 6,590,957 B1 * | 7/2003 | Warburton | | A61B 6/4241 | |
| | | | | 378/5 | |
| 6,740,881 B2 * | 5/2004 | Malmin | | G01T 1/1642 | |
| | | | | 250/361 R | |
| 6,901,337 B2 * | 5/2005 | Tanaka | | G01D 1/04 | |
| | | | | 250/269.8 | |
| 7,439,515 B2 | 10/2008 | Bak | | | |
| 7,894,576 B2 * | 2/2011 | Carmi | | G01T 1/2985 | |
| | | | | 378/98.9 | |
| 2003/0033097 A1 * | 2/2003 | Tanaka | | G01T 1/171 | |
| | | | | 702/60 | |
| 2004/0017224 A1 * | 1/2004 | Turner | | H03F 3/087 | |
| | | | | 327/51 | |
| 2004/0036025 A1 * | 2/2004 | Wong | | G01T 1/171 | |
| | | | | 250/363.09 | |
| 2006/0284100 A1 * | 12/2006 | Bak | | G01T 1/171 | |
| | | | | 250/369 | |
| 2007/0076848 A1 * | 4/2007 | Walter | | A61B 6/4241 | |
| | | | | 378/98.8 | |
| 2007/0262251 A1 * | 11/2007 | Balan | | G01T 1/171 | |
| | | | | 250/252.1 | |
| 2008/0172206 A1 * | 7/2008 | Mott | | H01J 37/244 | |
| | | | | 702/189 | |
| 2009/0034682 A1 * | 2/2009 | Mott | | G01T 1/171 | |
| | | | | 378/86 | |
| 2009/0037126 A1 * | 2/2009 | Mott | | G01T 1/171 | |
| | | | | 702/79 | |
| 2009/0039273 A1 * | 2/2009 | Tkaczyk | | G01T 1/249 | |
| | | | | 250/370.06 | |
| 2010/0215230 A1 * | 8/2010 | Bornefalk | | G06T 11/005 | |
| | | | | 382/128 | |
| 2011/0155899 A1 * | 6/2011 | Dror | | G01T 1/247 | |
| | | | | 250/252.1 | |
| 2012/0239310 A1 * | 9/2012 | Ouvrier-Buffet | | G01T 1/171 | |
| | | | | 702/32 | |
| 2013/0146767 A1 * | 6/2013 | Seino | | G01T 1/171 | |
| | | | | 250/336.1 | |
| 2015/0063527 A1 * | 3/2015 | Daerr | | G01T 1/248 | |
| | | | | 378/5 | |
| 2015/0185332 A1 * | 7/2015 | Herrmann | | G01T 1/171 | |
| | | | | 250/336.1 | |
| 2016/0076935 A1 * | 3/2016 | Daerr | | G01J 1/44 | |
| | | | | 250/214 R | |

* cited by examiner

SYSTEM AND METHOD TO UNPILE OVERLAPPING PULSES

BACKGROUND

According to conventional nuclear medicine imaging, radiopharmaceuticals are introduced into a patient's body and migrate to organs, bones or tissues of interest. The radiopharmaceuticals emit gamma photons which are received by a detector. The detector generates signals based on the received gamma photons, and those signals are processed to determine the locations from which the gamma photons were emitted (i.e., the locations of the organs, bones or tissues of interest), and the intensities of the received gamma photons, which correspond to the amount of pharmaceutical uptake and the attenuation properties of organs, bones or tissues located between the locations and the detector. These locations and intensities are processed to produce a planar image of a region of the patient's body.

A gamma photon detector (also, a gamma camera) typically consists of a scintillator and light sensors optically coupled thereto. In operation, the scintillator receives (i.e., absorbs) a gamma photon and emits a number of visible light photons in response. The light photons are in turn detected by the light sensors, which may comprise photomultiplier tubes (PMTs). The PMTs absorb the light photons and produce corresponding electrons via the photoelectric effect. Each PMT multiplies the electrons it produces, resulting in an electrical pulse from each PMT whose magnitude is proportional to the energy of the original gamma photon received by the scintillator.

Continuing the above example, the scintillator may receive a second gamma photon and emit visible light photons in response. The PMTs absorb the light photons and produce electrical pulses as described above. If these electrical pulses are produced prior to decay of the electrical pulses resulting from the originally-received gamma photon, the electrical pulses are superposed, or "pile up", on each other in the output signals of the PMTs. These piled-up pulses do not provide useful imaging information, as it is not known what portion of the piled-up pulse is attributable to a first gamma photon and what portion is attributed to a second gamma photon. The problem may be exacerbated by additional gamma photons received in close succession, whose resultant PMT pulses may pile up on any number of previously-generated pulses. The problem is further exacerbated with increasing scintillator decay time (i.e., the amount of time over which light photons are emitted in response to a received gamma photon).

To address this problem, conventional imaging systems may discard signals in which two or more pulses are piled-up on one another. This approach undesirably ignores valid (i.e., unscattered) gamma photons and effectively reduces the maximum count rate of the scintillator. The reduced maximum count rate may consequently prolong an amount of time needed to complete an imaging procedure.

Some imaging systems utilize algorithms to attempt to distinguish the individual pulses within a piled-up signal. These algorithms are typically executed by a data processor that serially processes the individual signals from each PMT, as well as a summed PMT signal which is a combination of the individual signals from the PMTs. The maximum sustained count rate of the imaging system is therefore also limited by the time required to apply the algorithm to each PMT pulse signal.

It is therefore desirable to improve the effective count rate of a scintillator by processing an increased percentage of pulses that result from gamma photon interactions with the scintillator. It is also desirable to increase the maximum sustained count rate of an imaging system using an efficient unpiling algorithm and/or an efficient implementation of thereof.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION

The following description is provided to enable any person in the art to make and use the described embodiments and sets forth the best mode contemplated for carrying out the described embodiments. Various modifications, however, will remain readily apparent to those in the art.

Figure 1:
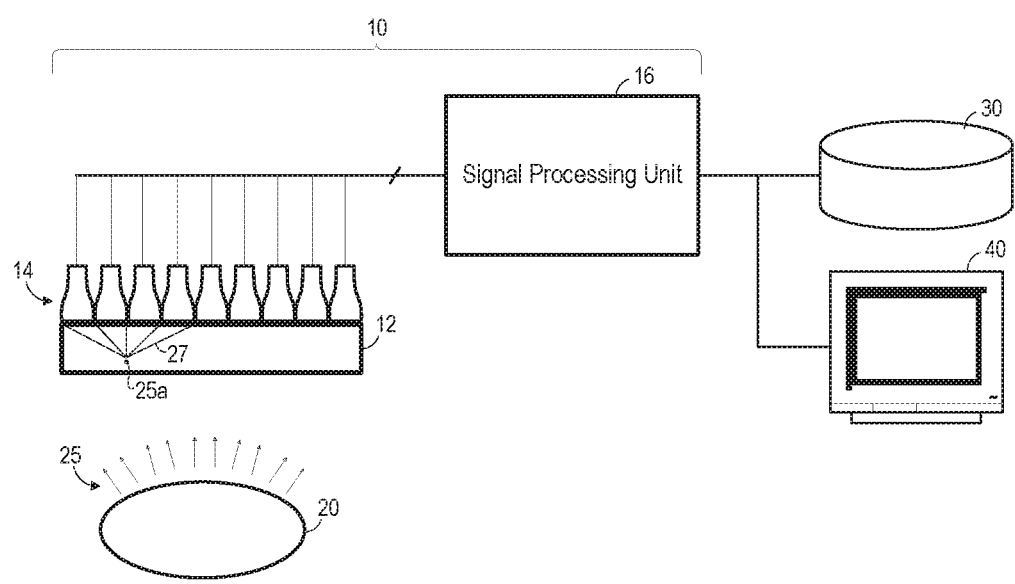
FIG. 1 illustrates a system according to some embodiments.

FIG. 1 illustrates detector 10 according to some embodiments. Detector 10 will be described below in the context of an Anger-type gamma camera, but embodiments are not limited thereto. Detector 10 may comprise any scintillator-based imaging device (e.g., a Positron Emission Tomography scanners). Some embodiments may be applied to any set of overlapping signals of any origin which have a duration sufficient for adequate sampling, and a constant shape (i.e., a shape which scales with energy).

Detector 10 includes scintillation crystal 12, light sensor array 14, and a signal processing unit 16. Scintillation crystal 12 may comprise a thallium-doped sodium iodide crystal that generates light photons in response to gamma radiation 25 received from volume 20 (e.g., a patient's body). Scintillation crystal 12 therefore converts the gamma radiation (e.g., gamma photon 25a) into light photons (e.g., light photons 27), which may be detected by sensor array 14.

Sensor array 11 may comprise an array of PMTs. A typical PMT of sensor array 11 may include a semi-transparent photocathode, a focusing grid, dynodes, and an anode (not shown). Sensor array 14 converts light photons emitted by scintillation crystal 12 into representative electronic signals. Signal processing unit 16 receives the electronic signals from the sensor array 14 and processes the electronic signals to generate an image of volume 20. Images generated by signal processing unit 16 may be stored in data storage device 30 and/or displayed on display 40.

According to some embodiments, a radioactive isotope (not shown) is administered to volume 20. The radioactive isotope emits gamma photons while present in volume 20, and these gamma photons 25 subsequently exit volume 20. Gamma photons 25 are collimated by a collimator (not shown) disposed between volume 20 and scintillation crystal 12 (to filter out scattered or stray gamma radiation), and the thus-collimated photons are received at various locations of scintillation crystal 12.

Figure 2:
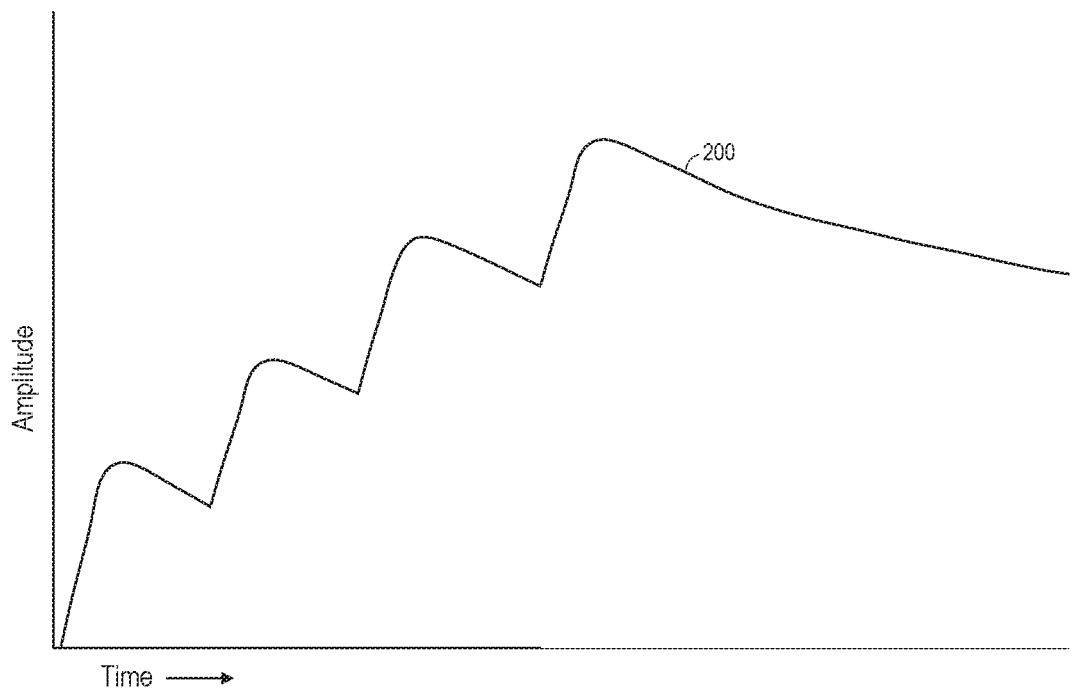
FIG. 2 illustrates a received signal according to some embodiments.
Figure 3:
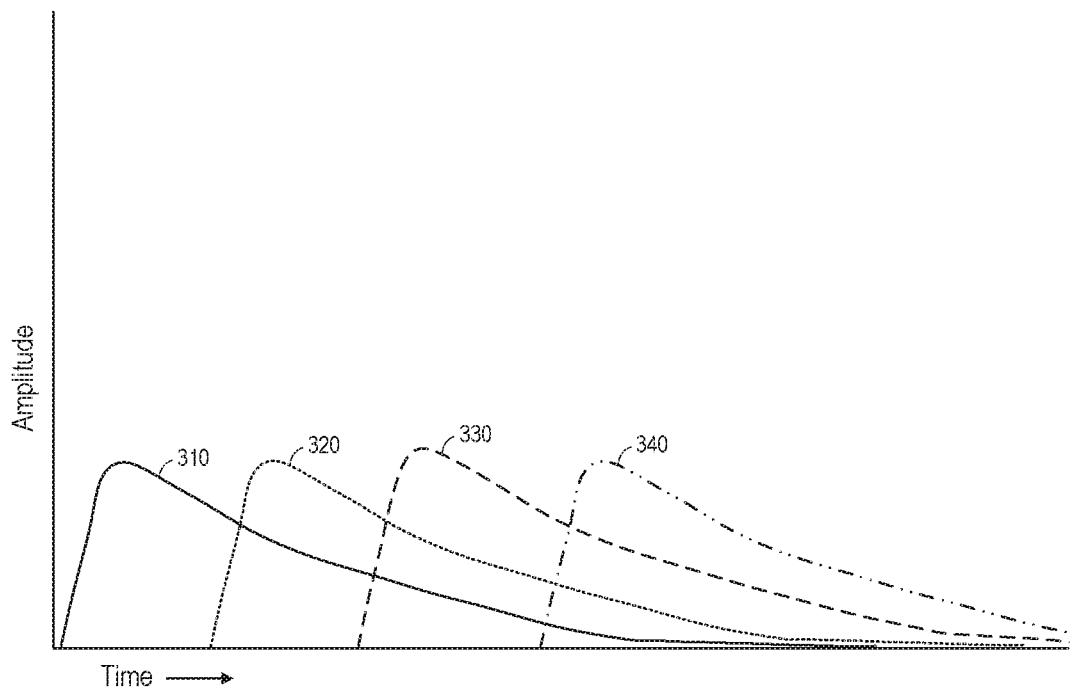
FIG. 3 illustrates unpiled pulses of the FIG. 2 signal according to some embodiments.

FIG. 2 illustrates signal 200 output by a PMT of array 14 according to some embodiments. Signal 200 is a superposition of four pulses, in which each pulse is piled-up on each preceding pulse. In other words, signal 200 represents four gamma photon interactions with scintillator 12, in which light photon emission resulting from each gamma photon interaction begins before the completion of light photon emission resulting from each previous gamma photon interaction. FIG. 3 illustrates four pulses 310, 320, 330 and 340 corresponding to each gamma photon interaction, and which together (i.e., summed) comprise signal 200. Embodiments are not limited to a four pulse pile-up or to pile ups in which each pulse is piled-up on each preceding pulse. The pulses need not have equal amplitude.

According to some embodiments, a signal comprised of two or more piled-up pulses (e.g., signal 200) is received and the respective energies of each constituent pulse (e.g., pulses 310, 320, 330 and 340) are estimated therefrom. The respective energies may be used to validate each pulse (e.g., to determine whether the pulse represents scattered gamma radiation or otherwise exhibits unacceptable signal-to-noise ratio characteristics), and/or to determine the locations of the gamma photon interaction corresponding to each pulse. Contrary to prior systems, most pulses are not discarded, substantially preserving the maximum count rate of scintillator 12. Moreover, in some embodiments, the energies are estimated more efficiently than in prior systems, resulting in an improved maximum count rate of imaging system 10.

Figure 4:
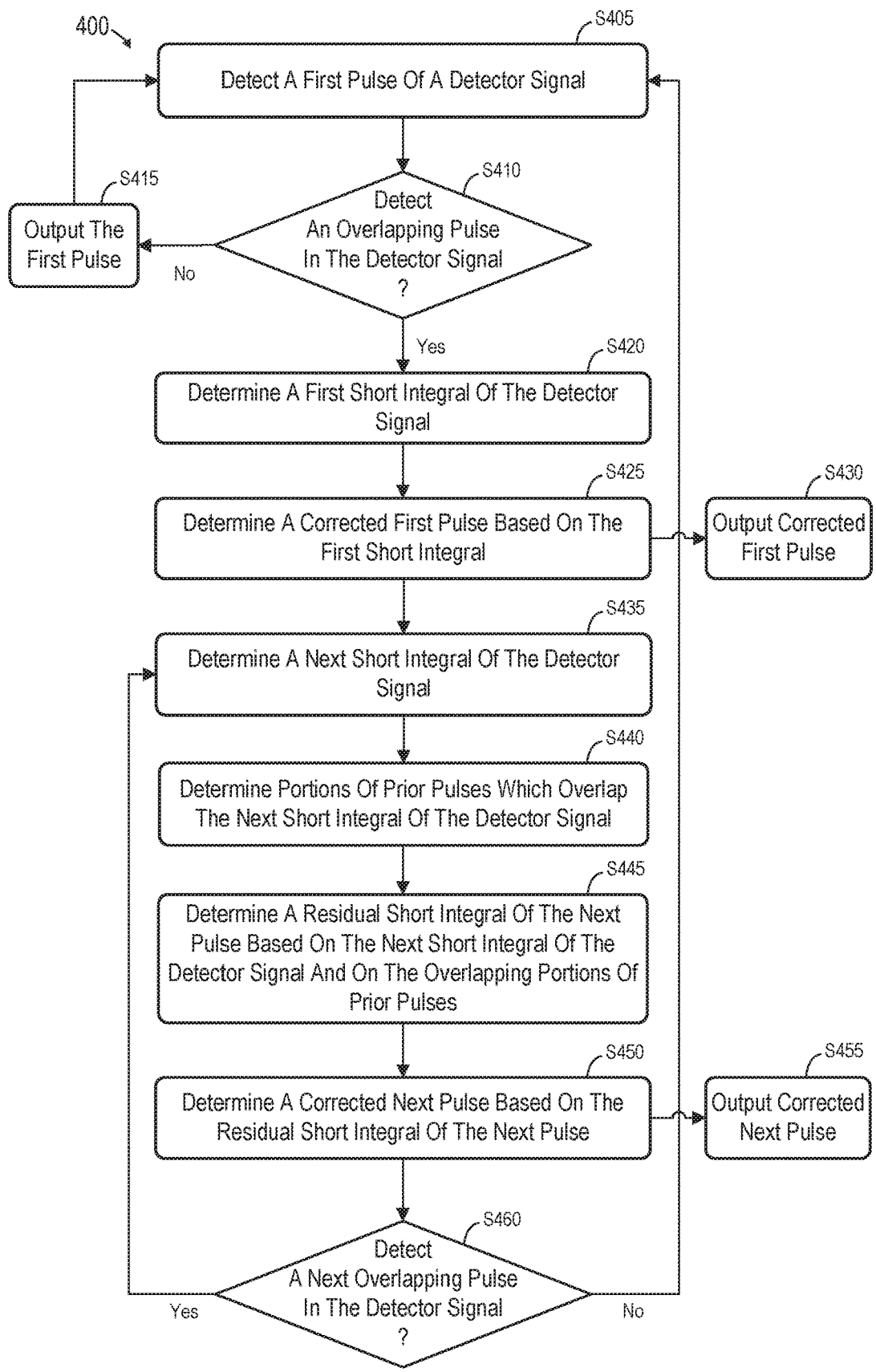
FIG. 4 is a flow diagram of a process to unpile overlapping pulses according to some embodiments.

FIG. 4 is a flow diagram of process 400 to determine energies of the constituent pulses of a signal comprised of two or more piled-up pulses according to some embodiments. Process 400 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape. Examples of these processes will be described below with respect to the elements of imaging system 10, but embodiments are not limited thereto.

Initially, at S405, a first pulse of a detector signal is detected. The detected pulse may be emitted by a light sensor and formed from electrons resulting from an interaction between a gamma photon and a scintillator as described above. Detection of a first pulse of a detector signal may comprise monitoring a signal from a light sensor of a detector (e.g., from a PMT of array 14) and determining that the amplitude of the signal has increased from some baseline value to a triggering threshold. With respect to FIG. 2, detection of the first pulse may comprise detection of the first "hump" of signal 200.

Next, at S410, it is determined whether the detector signal includes a pulse which overlaps the first pulse. S410 may comprise a determination of whether the detector signal rises after the first hump of the first pulse but before the first pulse has decreased back to a baseline level. If no such overlapping (i.e., piled-up) pulse is detected, the first pulse can be considered a full, non-overlapped pulse and flow proceeds to S415 to output the first pulse for further processing according to known imaging systems. Such further processing may include generation of an image based on the pulse and on pulses received from other PMTs, and may also include energy validation to determine whether the pulse includes useful imaging information (as opposed to noise). Flow then returns to S405 to await detection of a next "first" pulse of the detector signal.

Figure 5:
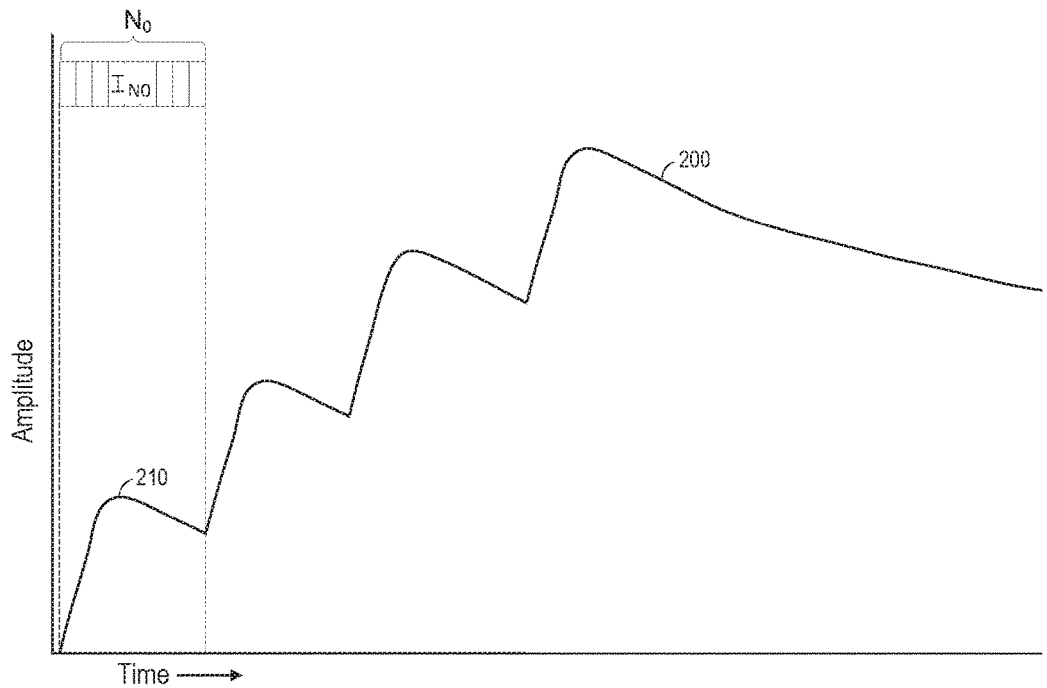
FIG. 5 illustrates integrated samples of a first pulse of a received signal according to some embodiments.

Flow proceeds to S420 if an overlapping pulse is detected at S410. A first short integral of the detector signal is determined at S420. FIG. 5 illustrates first short integral $I_{N_0}$ of signal 200. First short integral $I_{N_0}$ is determined based on $N_0$ samples of portion 210 of signal 200. In this regard, detector signal 200 may be received and amplified by a preamplifier and sampled by a fast analog-to-digital converter (FADC) according to some embodiments. The samples may be selectively integrated to determine an area under signal 200 (i.e., a signal energy) over the selected samples. According to some embodiments, the FADC operates at 30 Mhz and therefore samples signal 200 every 33.333 ns.

A corrected first pulse is determined at S425 based on the first short integral determined at S420. According to the present example, the corrected first pulse represents pulse 310, or the pulse which would have been received if not for piled-up pulses 320, 330 and 340.

Figure 6:
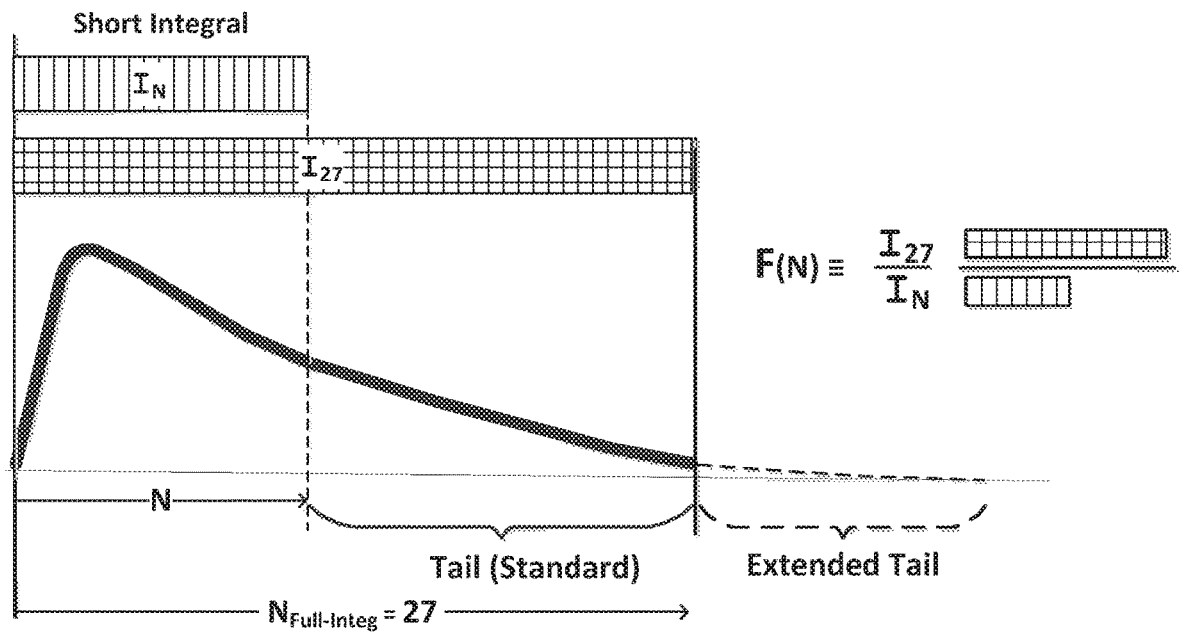
FIG. 6 illustrates a short integral and corresponding tails of a pulse according to some embodiments.

FIG. 6 illustrates determination of a corrected pulse at S425 according to some embodiments. Corrected pulse $I_{27}$ is determined based on short integral $I_N$ and function F(N). The present inventor has recognized that the relative shape of a signal pulse depends primarily on the scintillation decay time of the scintillation crystal and the smoothing induced by the electronic amplification before the signal pulse is digitized at the FADC, and that the amplitude of the pulse scales with the energy of the scintillation event. The ratio of the total energy of the first 27 samples of a signal to the energy of the signal over a given number of FADC samples may therefore be considered a constant for each given number of samples. The constants for a particular imaging system may be measured and stored in a lookup table which is indexed by the number of samples N. The constants of the lookup table therefore implement F(N).

Therefore, with reference to FIGS. 5 and 6, a constant $F(N_0)$ corresponding to the number of samples $N_0$ is determined (e.g., based on the aforementioned lookup table) at S425. This constant is multiplied by the first short integral $I_{N0}$ to determine corrected first pulse $I_0$. Because the constant is based on the total energy of the first 27 pulses of a signal, corrected first pulse $I_0$ represents the energy of the first 27 samples of a pulse which would have been received if not for piled-up pulses 320, 330 and 340. Embodiments are not limited to a "standard" pulse length of 27 samples. As shown by the "Extended Tail" of FIG. 6, the expected pulse period actually extends for more than 27 samples. Accordingly, the constants of $F(N_0)$ may be determined based on a pulse length corresponding to any number of pulse samples.

Figure 7:
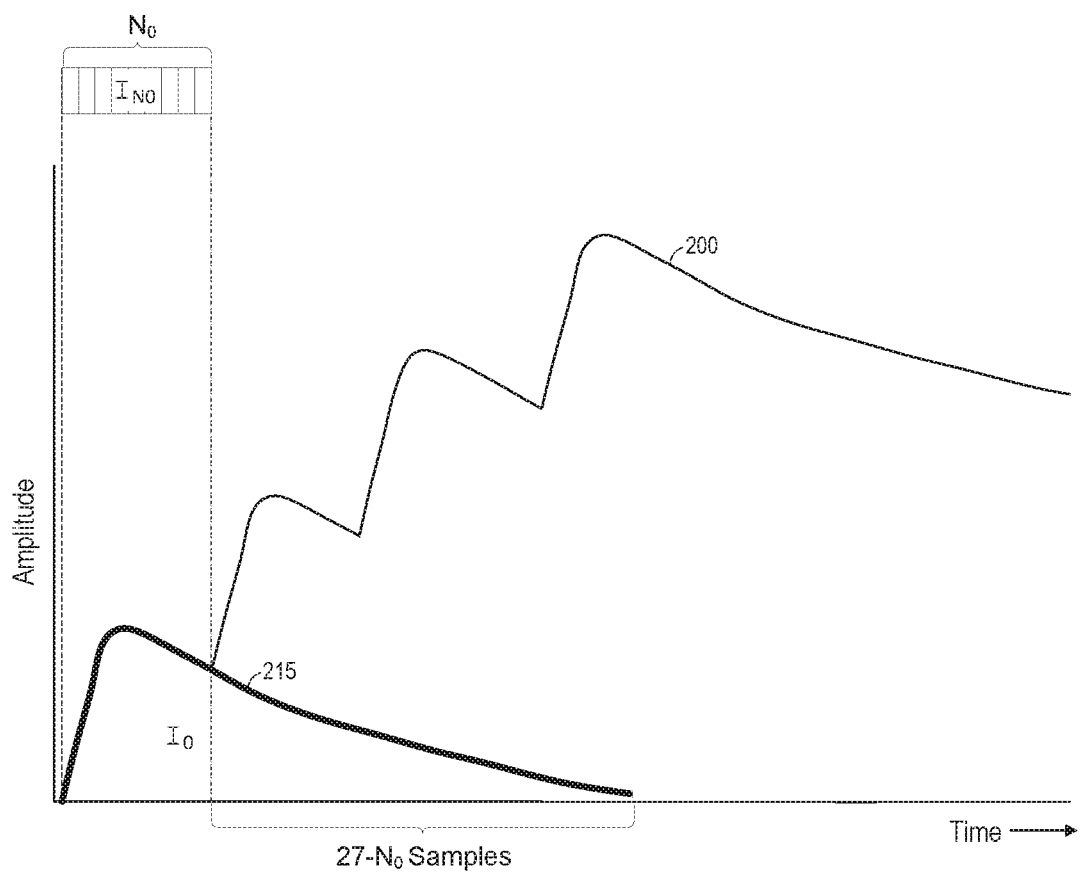
FIG. 7 illustrates integrated samples of a first pulse and a corresponding first standard tail according to some embodiments.

Continuing with the present example, FIG. 7 illustrates corrected first pulse $I_0$ 215, where $I_0$ denotes the energy of the corrected full pulse. This energy corresponds to the area under the 27 sample-wide pulse 215 of FIG. 7. Corrected first pulse $I_0$ may be output for further processing at S430 as described above. Corrected first pulse $I_0$ may also be buffered for use in the unpiling of subsequent pulses, as will be described below.

According to some embodiments of S425, the applicable constant is a function of the number of samples N and the phase $\phi$ of the current pulse (i.e., $F=F(N_0,\phi)$). Phase $\phi$ represents the arrival time of a pulse within the 33.333 ns window of a first sample of the N samples. Because phase $\phi$ provides additional granularity regarding the percentage of a "full" pulse which is represented by a short integral $I_N$, the constant provided by $F(N_0,\phi)$ may provide a more precise measure of the ratio of the total energy of a pulse to the energy of the short integral $I_N$.

Figure 8:
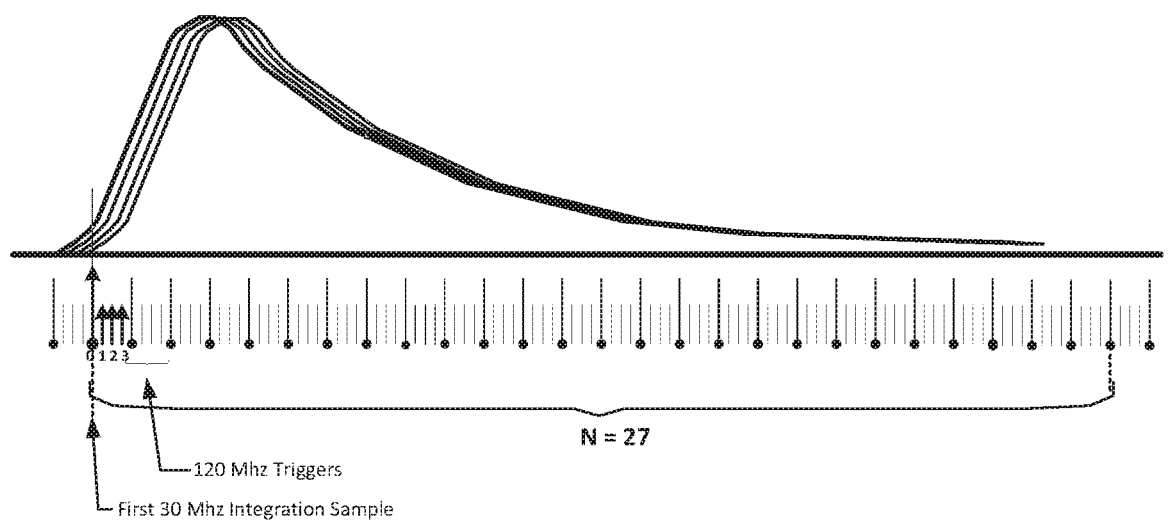
FIG. 8 illustrates integration sample timings and phase timings of a received signal according to some embodiments.

FIG. 8 depicts four identical pulses received from a PMT/preamplifier by an FADC according to some embodiments. 30 Mhz sample points are identified by long hash marks with dots on the abscissa and represent one sample every 33.333 ns. According to the present embodiment, a fully integrated pulse is defined as the sum of 27 samples (i.e., samples #0 through #26) of the 30 Mhz FADC, although embodiments are not limited thereto.

An $E_{sum}$ signal, which is the summation of the signals from each sensor of sensor array 14, is simultaneously received by another FADC operating at a higher sampling rate (e.g., 120 Mhz). The sampling period (i.e., 8.333 ns) of the 120 Mhz FADC is indicated by the short hashes in FIG. 8, and, as shown, is in sync with the sampling period of the 30 Mhz FADCs. The samples of the a 120 Mhz FADC are used to identify the arrival time (i.e., phase CP) of a pulse. The four pulses depicted in FIG. 7 could trigger at four different sample points (phases) of the 120 Mhz FADC but are integrated by the same set of 30 Mhz samples (0 through 27).

Figure 9:
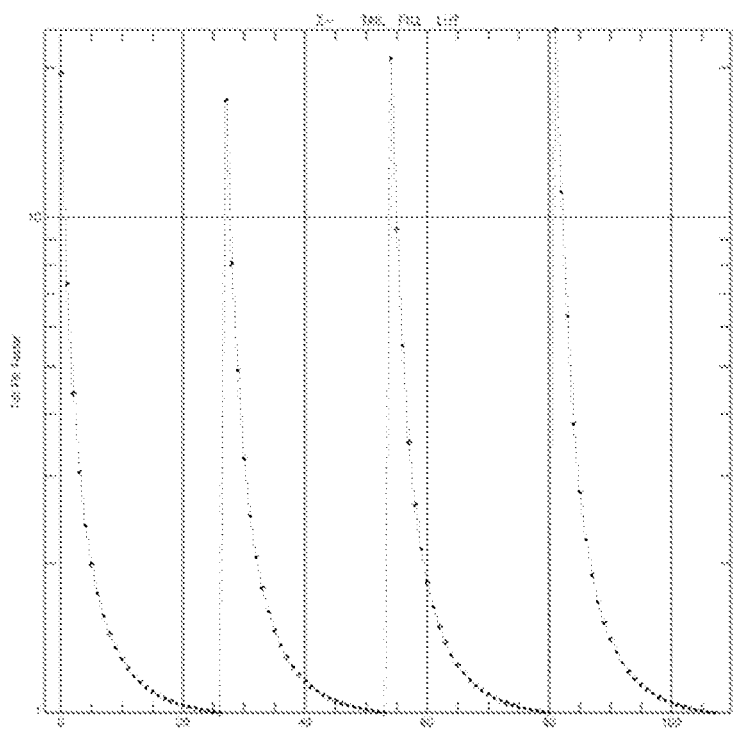
FIG. 9 illustrates entries of a lookup table according to some embodiments.

FIG. 9 represent a respective lookup table providing the value of F(N, CP) according to some embodiments. Since N may span 1 to 27 samples and the arrival time may comprise one of four phases, the dimension of each lookup table dimension is 27×4. From left to right, FIG. 9 shows the constants (i.e., the Tail Fill Factors) for each of 27 samples for a pulse arriving at phase 0, phase 1, phase 2, and phase 3, respectively.

Figure 10:
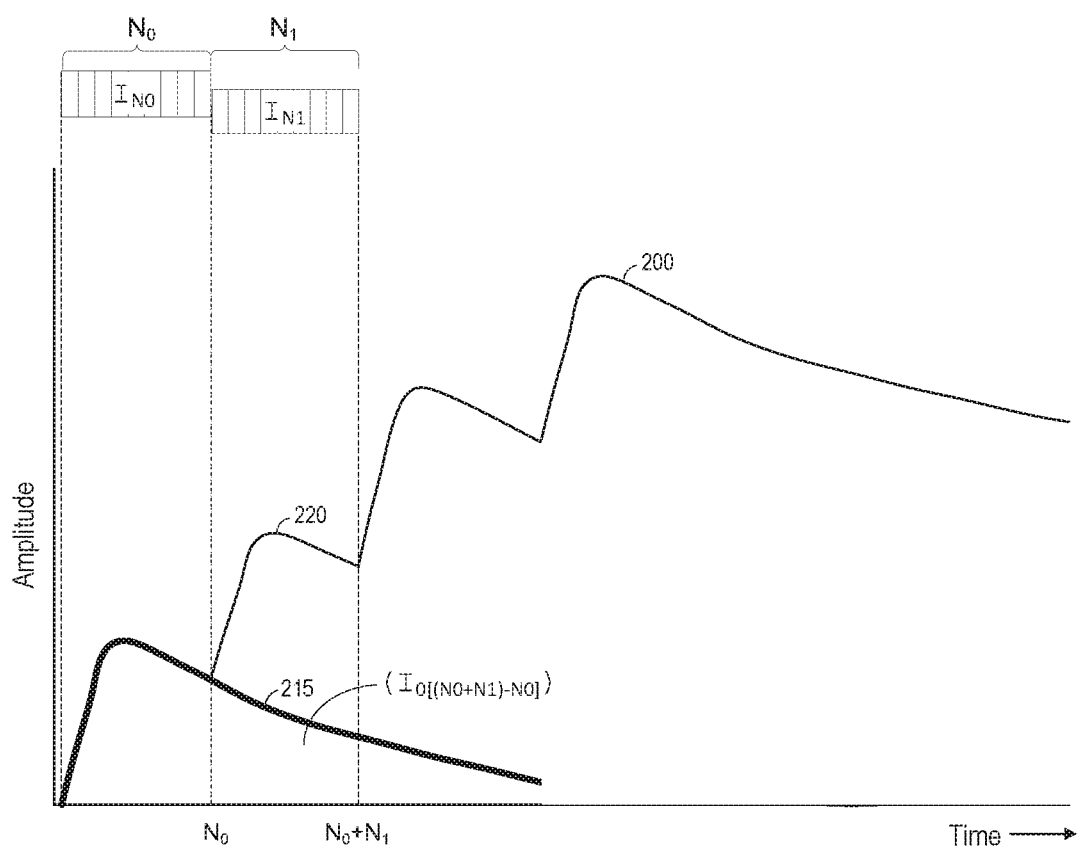
FIG. 10 illustrates integrated samples of a second pulse of a received signal and a corresponding portion of a tail of a first pulse according to some embodiments.

Returning to process 400, a next short integral of the detector signal is determined at S435. FIG. 10 illustrates next short integral $I_{N1}$ of signal 200. Short integral $I_{N1}$ is determined based on the $N_1$ samples of portion 220 (i.e., the portion of signal 200 including the $N_0+1^{th}$ sample to a next pile-up of signal 200). As shown, short integral $I_{N1}$ includes energy from pulse 215 as well as energy of the next pulse which is piled-up on pulse 215.

Next, portions of the prior pulse(s) which overlap the short integral determined at S435 are determined at S440. With respect to FIG. 10, the portion of prior pulse 215 between samples $N_0$ and $(N_0+N_1)$ is determined to overlap short integral $I_{N1}$ at S440.

A residual short integral of the next pulse is determined at S445, based on the short integral most-recently determined at S435 (i.e., $I_{N1}$) and on the overlapping portions determined at S440. With respect to the present example, S445 comprises determining an energy of the portion of corrected pulse $I_0$ which contributes to the total energy of portion 220 of the detector signal 200 and subtracting this energy from the most-recently determined short integral. This energy is represented in FIG. 10 as $I_{0[(N0+N1)-N0]}$. Accordingly, $RSI_1 = I_{N1} - I_{0[(N0+N1)-N0]}$.

Determining an energy of the overlapping portion of corrected pulse $I_0$ at S445 may proceed using a lookup table similarly to the above description of S425. For example, a lookup table may provide the percentage of the cumulative integral of an FADC signal from a PMT over some range of samples (e.g., 60). The percentage corresponding to the $(N_0)^{th}$ sample is determined and is subtracted from percentage corresponding to the $(N_0+N_1)^{th}$ sample. This gives the percentage of the cumulative integral which corresponds to the overlapping portion of the prior pulse. The percentage is multiplied by the energy of the (corrected) prior pulse to determine the energy attributable to the overlapping portion of the prior pulse. With respect to the current example, $I_{0[(N0+N1)-N0]} = I_0 * [CI(N_0+N_1) - CI(N_0)]$. Therefore, $RSI_1 = I_{N1} - I_0 * [CI(N_0+N_1) - CI(N_0)]$.

According to some embodiments, the energy attributable to the overlapping portion of the prior pulse is divided by the percentage of the cumulative integral corresponding to the $27^{th}$ sample to normalize the energy to the "standard" pulse (i.e., $I_{0[(N0+N1)-N0]} = I_0 * \{[CI(N_0+N_1) - CI(N_0)]/CI(27)\}$).

According to some embodiments of S445, the percentage of the cumulative integral is a function of the number of samples N as well as the phase $\phi$ of the overlapping prior pulse (i.e., $CI=CI(N_0,\phi)$), where phase $\phi$ is as described above.

Figure 11:
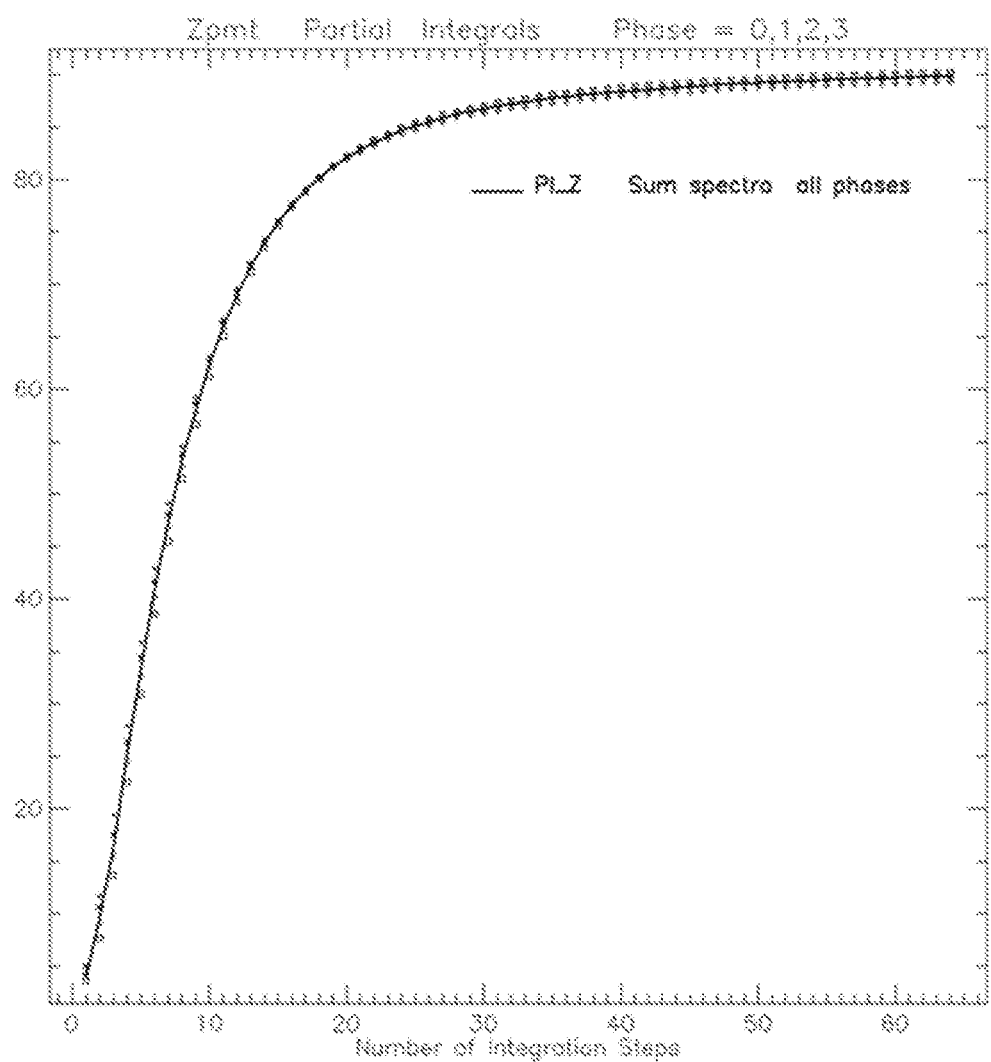
FIG. 11 illustrates entries of a lookup table according to some embodiments.

FIG. 11 represents a lookup tables providing the value of CI(N, $\phi$) according to some embodiments. The different symbols at each N value represent CI(N) at four different phases. The residual short integral depends on the difference of CI's of different N's and the same phase. In this case, the phase-averaged CI value may be used for all phases of a given $N^{th}$ sample (i.e., the solid curve of FIG. 11).

A corrected next pulse is determined at S450 based on the residual short integral of the next pulse which was determined at S445. Continuing the present example, the corrected next pulse $I_1$ represents pulse 320 of FIG. 3. Accordingly, the residual short integral determined at S445 (i.e., $RSI_1$) represents the energy of the first $N_1$ samples of pulse 320.

As described with respect to S425, the corrected next pulse $I_1$ may therefore be determined based on residual short integral $RSI_1$ and function $F(N, \phi)$. In particular, a constant $F(N_1, \phi_1)$ corresponding to the number of samples $N_1$ is determined based on a lookup table, and this constant is multiplied by residual short integral $RSI_1$ to determine corrected next pulse L. Because the constant $F(N_1, \phi_1)$ according to the present embodiment is based on the total energy of the first 27 pulses of a signal, corrected next pulse $I_1$ represents the energy of the first 27 samples of a pulse which would have been received if not for preceding pulse 310 and piled-up pulses 330 and 340. As described above, the constant may comprise a function of the number of samples $N_1$ and of the phase $\Phi_1$ of pulse 320 of FIG. 3.

Figure 12:
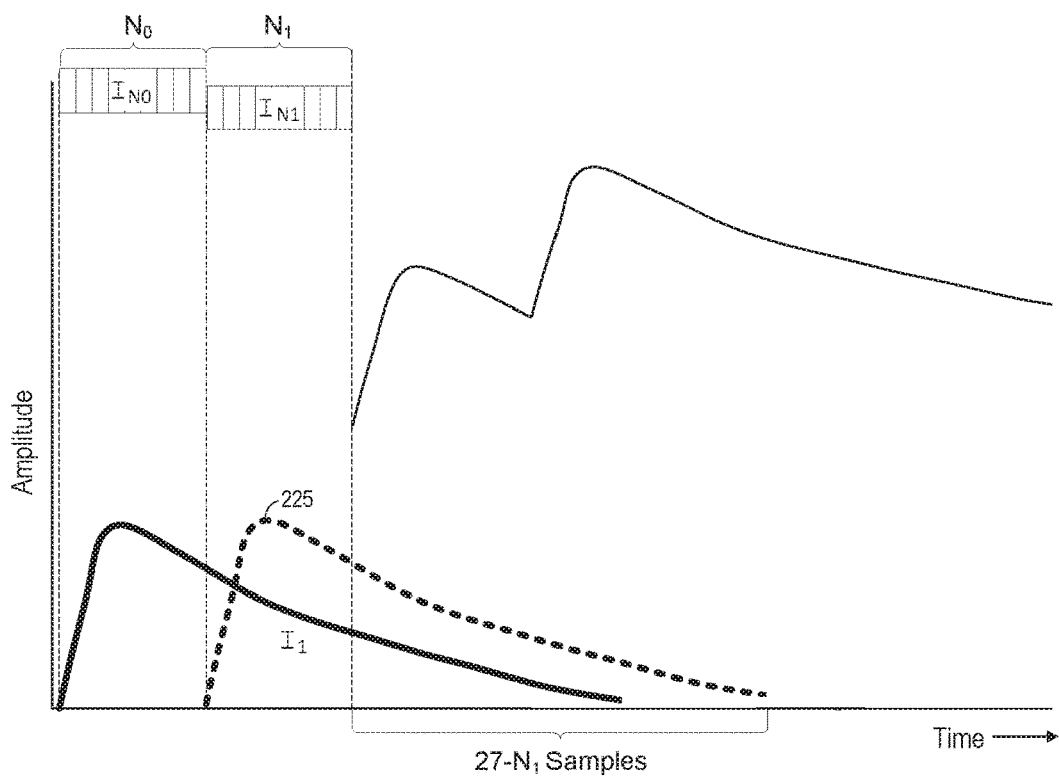
FIG. 12 illustrates integrated samples of a first pulse, a corresponding first standard tail, a second pulse, and a corresponding second standard tail according to some embodiments.

FIG. 12 illustrates corrected next pulse $I_1$ 225, where $I_1$ denotes the energy of (i.e., the area under) the 27 sample-wide pulse 225. Corrected next pulse $I_1$ may be output for further processing at S455 as described above. As will be described below, corrected next pulse $I_1$ may also be buffered for use in the unpiling of subsequent pulses.

Next, at S460, it is determined whether the detector signal includes a pulse which overlaps the next pulse (i.e., pulse 225). S460 may comprise a determination of whether detector signal 210 rises after the hump of next pulse 225 but before signal 210 has decreased back to a baseline level. If no such overlapping pulse is detected, process 400 returns to S405 to await a next "first" pulse of a detector signal.

Figure 13:
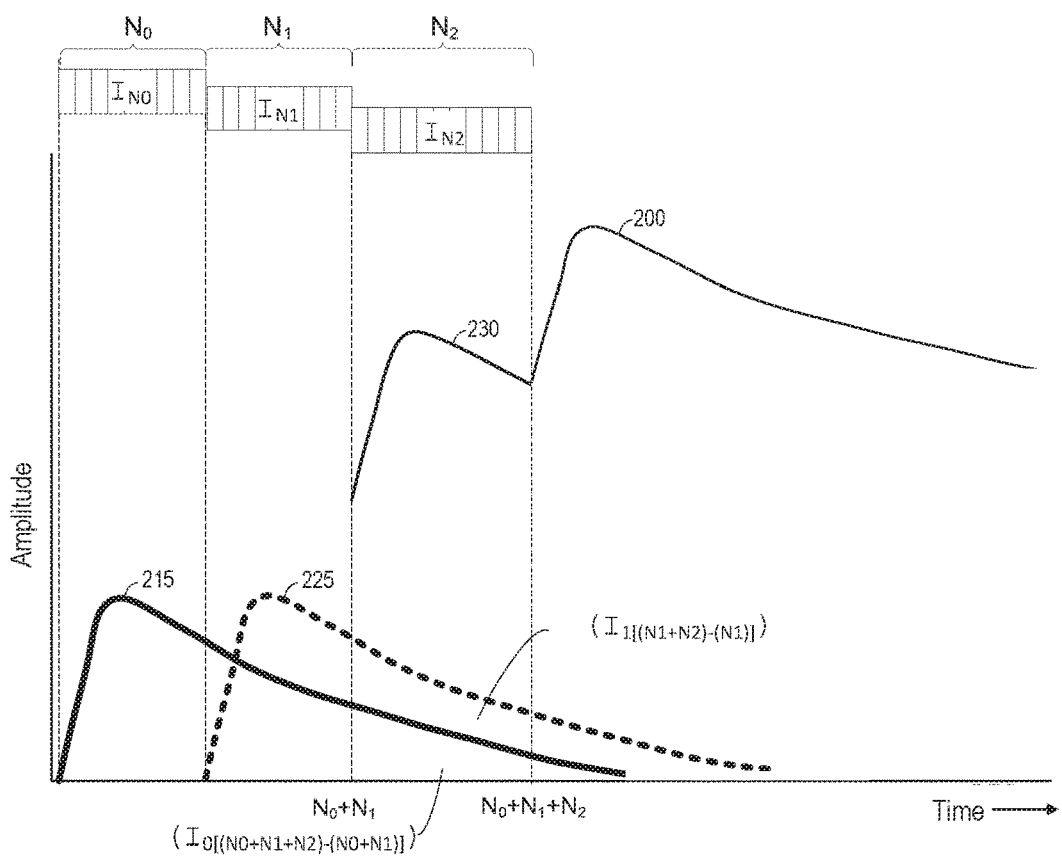
FIG. 13 illustrates integrated samples of a third pulse of a received signal, a corresponding portion of a tail of a first pulse, and a corresponding portion of a tail of a second pulse according to some embodiments.

Flow returns to S435 if an overlapping pulse is detected at S460. A next short integral of the detector signal is determined at S435. FIG. 13 illustrates next short integral $I_{N2}$ of signal 200. Short integral $I_{N2}$ is determined based on the illustrated $N_2$ samples of portion 230 of signal 200 (i.e., the portion of signal 200 including the $N_0+N_1+1^{th}$ sample through the $N_0+N_1+N_2^{th}$ sample).

The portions of prior pulses which overlap the next short integral (i.e., $I_{N2}$) are determined at S440. As shown in FIG. 13, short integral $I_{N2}$ includes energy from pulse 215, energy from pulse 225, and energy of the next pulse which is piled thereon. More specifically, the portion of prior pulse 215 between samples $(N_0+N_1)$ and $(N_0+N_1+N_2)$, and the portion of prior pulse 225 between samples $(N_0+N_1)$ and $(N_0+N_1+N_2)$ are determined to overlap short integral $I_{N2}$ at S440.

A residual short integral (i.e., $RSI_2$) of the next pulse is determined at S445, based on the most-recently determined short integral (i.e., $I_{N2}$) and on the overlapping portions determined at S440. With respect to the present example, S445 comprises determining an energy of the portion of corrected pulse $I_0$ and an energy of the portion of corrected pulse $I_1$ which contribute to the total energy of portion 230 of the detector signal 200. The energy of the portion of prior pulse 215 between samples $(N_0+N_1)$ and $(N_0+N_1+N_2)$ of prior pulse 215 is represented in FIG. 13 as $I_{0[(N0+N1+N2)-(N0+N1)]}$, and the energy of the portion of prior pulse 225 between samples $(N_1)$ and $(N_1+N_2)$ of pulse 225 is represented as $I_{1[(N1+N2)-(N1)]}$. Accordingly, $RSI_2 = I_{N1} - I_{0[(N0+N1+N2)-(N0+N1)]} - I_{1[(N1+N2)-(N1)]}$.

Determining the energies of the overlapping portions of corrected pulses $I_0$ and $I_1$ may include determining the percentage of the cumulative integral of an FADC signal corresponding to the $((N_0+N_1))^{th}$ sample from the above-described lookup table and subtracting this percentage from the percentage corresponding to the $(N_0+N_1+N_2)^{th}$ sample. This gives the percentage of the cumulative integral which corresponds to the overlapping portion of the corrected pulse $I_0$. To determine the percentage of the cumulative integral which corresponds to the overlapping portion of the corrected pulse $I_1$, the percentage of the cumulative integral of an FADC signal corresponding to the $(N_1)^{th}$ sample is determined from the above-described lookup table and this percentage is subtracted from the percentage corresponding to the $(N_1+N_2)^{th}$ sample. This gives the percentage of the cumulative integral which corresponds to the overlapping portion of the corrected pulse $I_1$.

The percentage of the cumulative integral which corresponds to the overlapping portion of the corrected pulse $I_0$ is multiplied by the energy of corrected pulse $I_0$ to determine the energy attributable to the overlapping portion of corrected pulse $I_0$. Accordingly, $I_{0[(N0+N1+N2)-(N0+N1)]} = I_0 * [CI(N_0+N_1+N_2) - CI(N_0+N_1)]$. Similarly, $I_{1[(N1+N2)-(N1)]} = I_1 * [CI(N_1+N_2) - CI(N_1)]$. Consequently, $RSI_2 = I_{N2} - I_0 * [CI(N_0+N_1+N_2) - CI(N_0+N_1)] - I_1 * [CI(N_1+N_2) - CI(N_1)]$.

As described above, the energy attributable to the overlapping portions of the prior pulses may be divided by the percentage of the cumulative integral corresponding to the 27th sample to normalize the energy to the "standard" pulse (i.e., $I_{0[(N0+N1+N2)-(N0+N1)]} = I_0 * \{[CI(N_0+N_1+N_2) - CI(N_0+N_1)]/CI(27)\}$. Similarly, $I_{1[(N1+N2)-(N1)]} = I_1 * \{[CI(N_1+N_2) - CI(N_1)]/CI(27)\}$. In such a case, $RSI_2 = I_{N2} - I_0 * \{[CI(N_0+N_1+N_2) - CI(N_0+N_1)]/CI(27)\} - * \{[CI(N_1+N_2) - CI(N_1)]/CI(27)\}$.

The residual short integral $RSI_2$ represents the energy of the first $N_2$ samples of the piled-up pulse 330 of FIG. 3. A corrected next pulse $I_2$ may be determined at S450 based on residual short integral $RSI_2$ and function $F(N, \phi)$ as described above with respect to corrected pulse $I_1$.

In particular, a constant $F(N_2, \phi)$ corresponding to the number of samples $N_2$ is determined based on a lookup table, and this constant is multiplied by residual short integral $RSI_2$ to determine corrected next pulse $I_2$. Because the constant $F(N_2, \phi_2)$ according to the present embodiment is based on the total energy of the first 27 pulses of a signal, corrected next pulse $I_2$ represents the energy of the first 27 samples of a pulse which would have been received if not for preceding pulses 310 and 320 and piled-up pulse 340.

Figure 14:
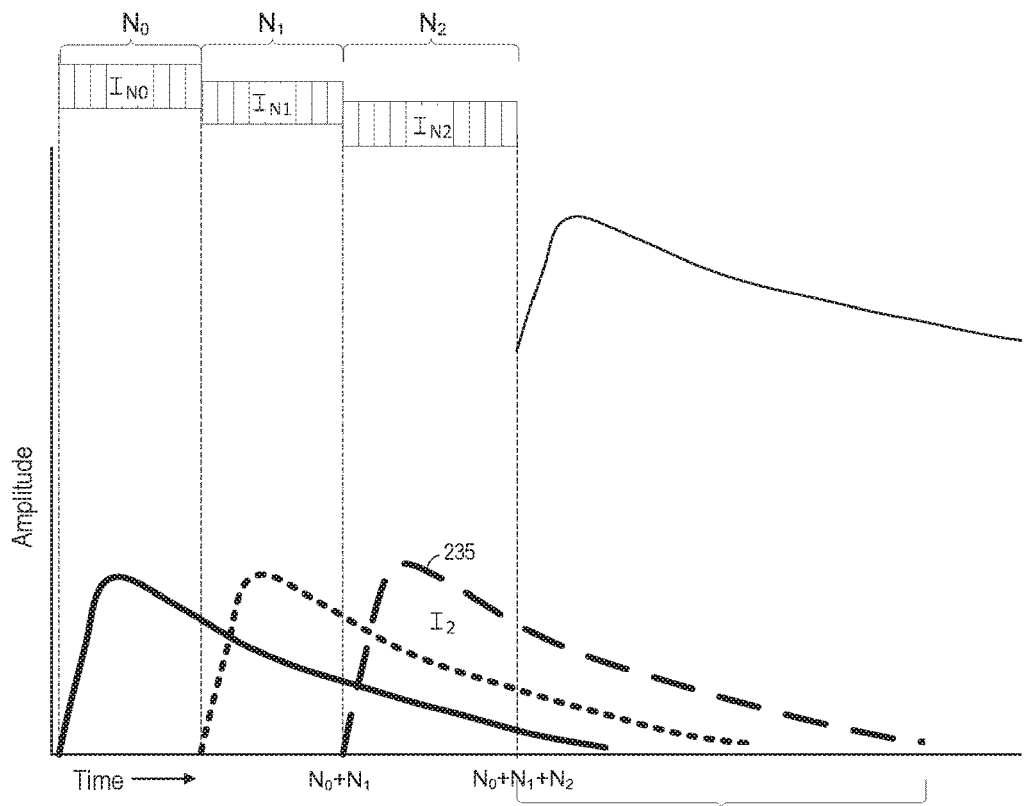
FIG. 14 illustrates integrated samples of a first pulse, a corresponding first standard tail, a second pulse, a corresponding second standard tail, a third pulse, and a corresponding third standard tail according to some embodiments.

FIG. 14 illustrates corrected next pulse $I_2$ 235, where $I_2$ denotes the energy of the 27 sample-wide pulse 235. As described above, the energy of corrected next pulse $I_2$ may be output for further processing at S455, and may also be buffered for use in the unpiling of subsequent pulses.

Figure 15:
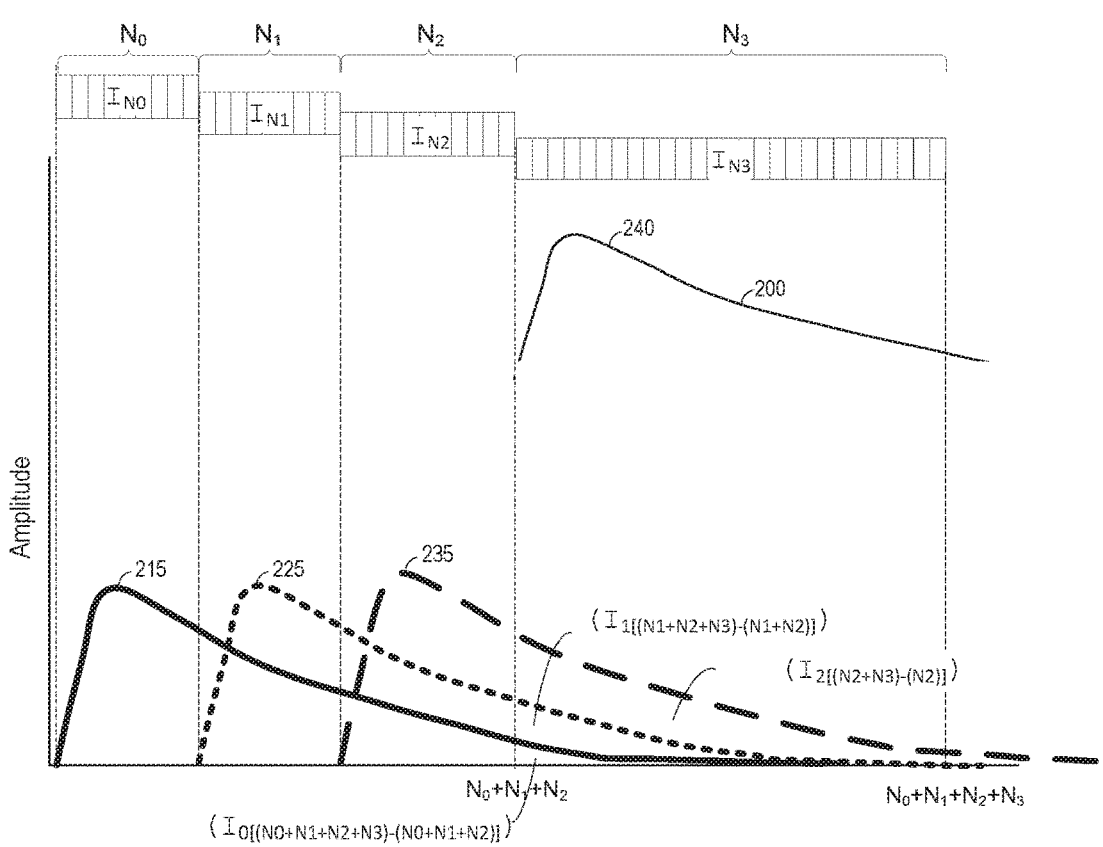
FIG. 15 illustrates integrated samples of a fourth pulse of a received signal, a corresponding portion of a tail of a first pulse, a corresponding portion of a tail of a second pulse, and a corresponding portion of a tail of a third pulse according to some embodiments.

It is then determined at S460 that detector signal 200 includes a pulse which overlaps the next pulse (i.e., pulse 235), and a next short integral of detector signal 200 is determined at S435. FIG. 15 illustrates next short integral $I_{N3}$ of signal 200. Short integral $I_{N3}$ is determined based on the illustrated $N_3$ samples of portion 240 of signal 200 (i.e., the portion of signal 200 including the $N_0+N_1+N_2+1^{th}$ sample through the $N_0+N_1+N_2+N_3^{th}$ sample).

Portions of prior pulses which overlap the next short integral (i.e., $I_{N3}$) are then determined at S440. As shown in FIG. 15, short integral $I_{N3}$ includes energy from pulse 215, energy from pulse 225, energy from pulse 235, and energy of the next pulse which is piled thereon. More specifically, the portion of prior pulse 215 between samples $(N_0+N_1+N_2)$ and $(N_0+N_1+N_2+N_3)$, the portion of prior pulse 225 between samples $(N_1+N_2)$ and $(N_1+N_2+N_3)$, and the portion of prior pulse 235 between samples $(N_2)$ and $(N_2+N_3)$ are determined to overlap short integral $I_{N3}$ at S440.

A residual short integral (i.e., $RSI_3$) of the next pulse is determined at S445, based on the most-recently determined short integral (i.e., $I_{N3}$) and on the overlapping portions determined at S440. S445 therefore comprises determining an energy of the portions of corrected pulses $I_0$, $I_1$, and $I_2$ which contribute to the total energy of portion 240 of the detector signal 200. The energy of the portion of prior pulse 215 between samples $(N_0+N_1+N_2)$ and $(N_0+N_1+N_2+N_3)$ of prior pulse 215 is represented in FIG. 15 as $I_{0[(N0+N1+N2+N3)-(N0+N1+N2)]}$, the energy of the portion of prior pulse 225 between samples $(N_1+N_2)$ and $(N_1+N_2+N_3)$ of pulse 225 is represented as $I_{1[(N1+N2+N3)-(N1+N2)]}$, and the energy of the portion of prior pulse 235 between samples $(N_2)$ and $(N_2+N_3)$ of pulse 225 is represented as $I_{2[(N2+N3)-(N2)]}$. Accordingly, $RSI_3 = I_{N1} - I_{0[(N0+N1+N2+N3)-(N0+N1+N2)]} - I_{1[(N1+N2+N3)-(N1+N2)]} - I_{2[(N2+N3)-(N2)]}$.

As described above, the percentage of the cumulative integral which corresponds to the overlapping portion of a corrected pulse I is multiplied by the energy of the corrected pulse I to determine the energy attributable to the overlapping portion of the corrected pulse I. Accordingly, $I_{0[(N0+N1+N2+N3)-(N0+N1+N2)]} = I_0 * [CI(N_0+N_1+N_2+N_3) - CI(N_0+N_1+N_2)]$, $I_{1[(N1+N2+N3)-(N1+N2)]} = I_1 * [CI(N_1+N_2+N_3) - CI(N_1+N_2)]$, and $I_{2[(N2+N3)-(N2)]} = I_2 * [CI(N_2+N_3) - CI(N_2)]$. Consequently, $RSI_3 = I_{N3} - I_0*[CI(N_0+N_1+N_2+N_3) - CI(N_0+N_1+N_2)] - I_1*[CI(N_1+N_2+N_3) - CI(N_1+N_2)] - I_2*[CI(N_2+N_3) - CI(N_2)]$. As also described above, the energy attributable to the overlapping portions of the prior pulses may be divided by the percentage of the cumulative integral corresponding to the 27th sample to normalize the energy to the "standard" pulse.

The residual short integral $RSI_3$ represents the energy of the first $N_3$ samples of the piled-up pulse 340 of FIG. 3. A corrected next pulse $I_3$ may be determined at S450 based on residual short integral $RSI_3$ and function $F(N, \phi)$ as described above with respect to corrected pulses $I_1$ and $I_2$. For example, a constant $F(N_3, \phi_3)$ corresponding to the number of samples $N_3$ is determined based on a lookup table, and this constant is multiplied by residual short integral $RSI_3$ to determine corrected next pulse $I_3$. According to the present example, corrected next pulse $I_3$ represents the energy of the first 27 samples of a pulse which would have been received if not for preceding pulses 310, 320 and 330.

Figure 16:
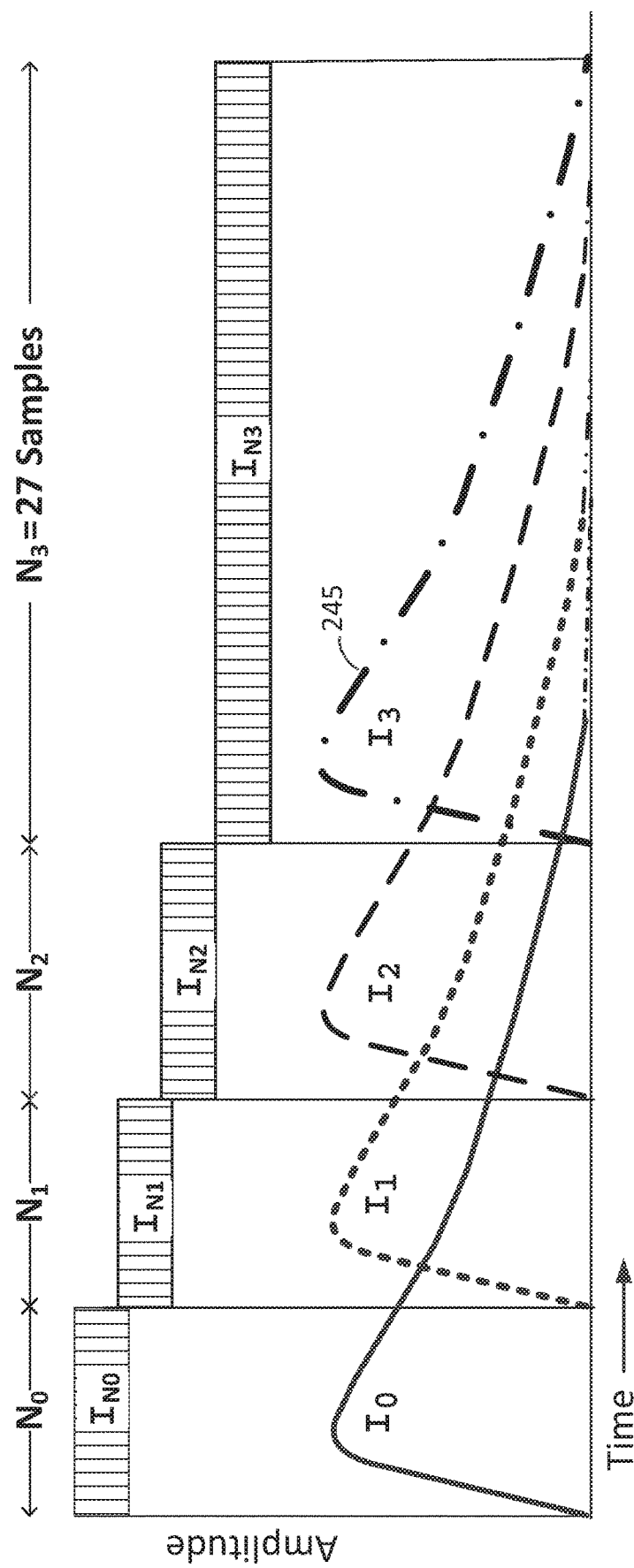
FIG. 16 illustrates a first pulse, a second pulse, a third pulse, and a fourth pulse of a received signal according to some embodiments.

FIG. 16 illustrates corrected next pulse $I_3$ 245, where $I_3$ denotes the energy of the 27 sample-wide pulse 245. As described above, the energy of corrected next pulse $I_3$ may be output for further processing at S455. In the present example $N_3=27$; no additional overlapping pulse is detected in signal 200 at S460, so flow returns to S405 to await reception of a next pulse.

Figure 17:
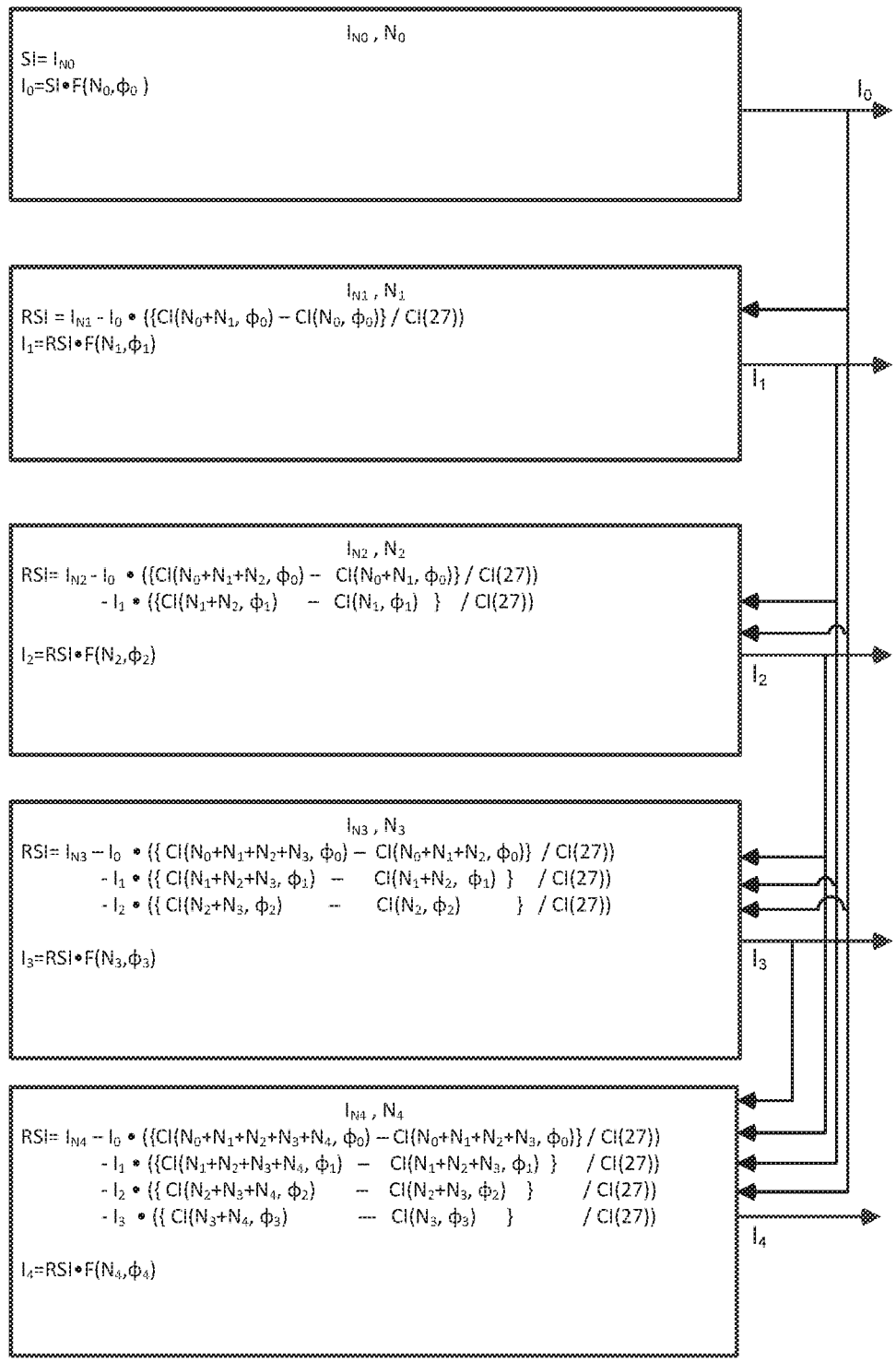
FIG. 17 illustrates a process according to some embodiments.
Figure 18:
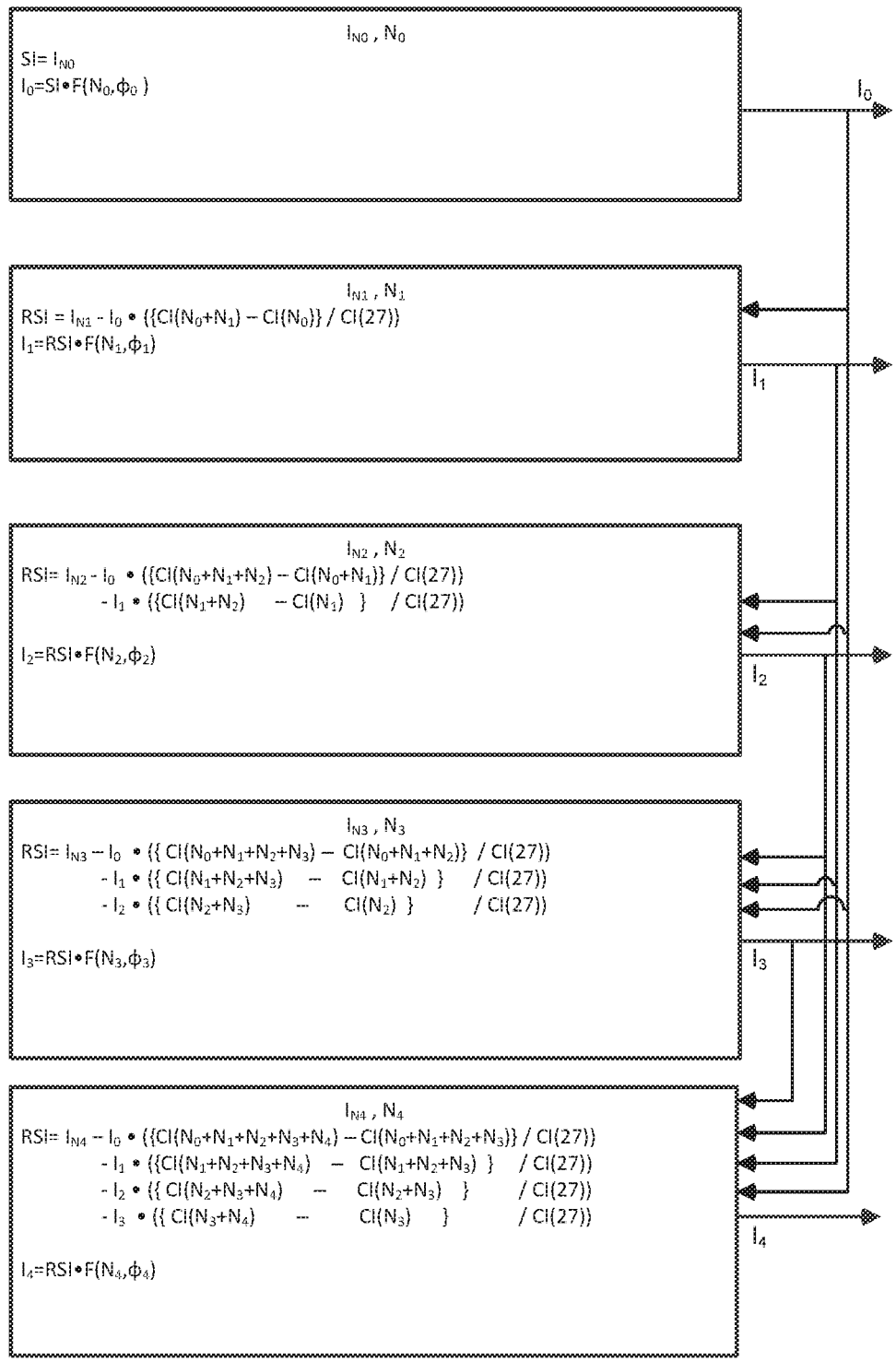
FIG. 18 illustrates a process according to some embodiments.

FIG. 17 is a flowchart illustrating an implementation of process 400 according to some embodiments. Each block of FIG. 17 represents determination of a corrected pulse value. The additional inputs to each block are listed at the top of each block (i.e., IN #, N #, Φ#). The second and subsequent blocks also receive as inputs the corrected pulse values of each preceding block, as well as their N, Φ values. FIG. 18 illustrates an alternative implementation also described above. Specifically, FIG. 18 is identical to FIG. 17 except that the cumulative integral determinations are not phase-dependent. The terms in RSI corresponding to underlying tails of previous pulses depend on the difference of cumulative integrals with different N's but the same phase. These differences are well-approximated by the difference of a single CI curve averaged over phase (i.e., the solid curve of FIG. 12.)

Figure 19:
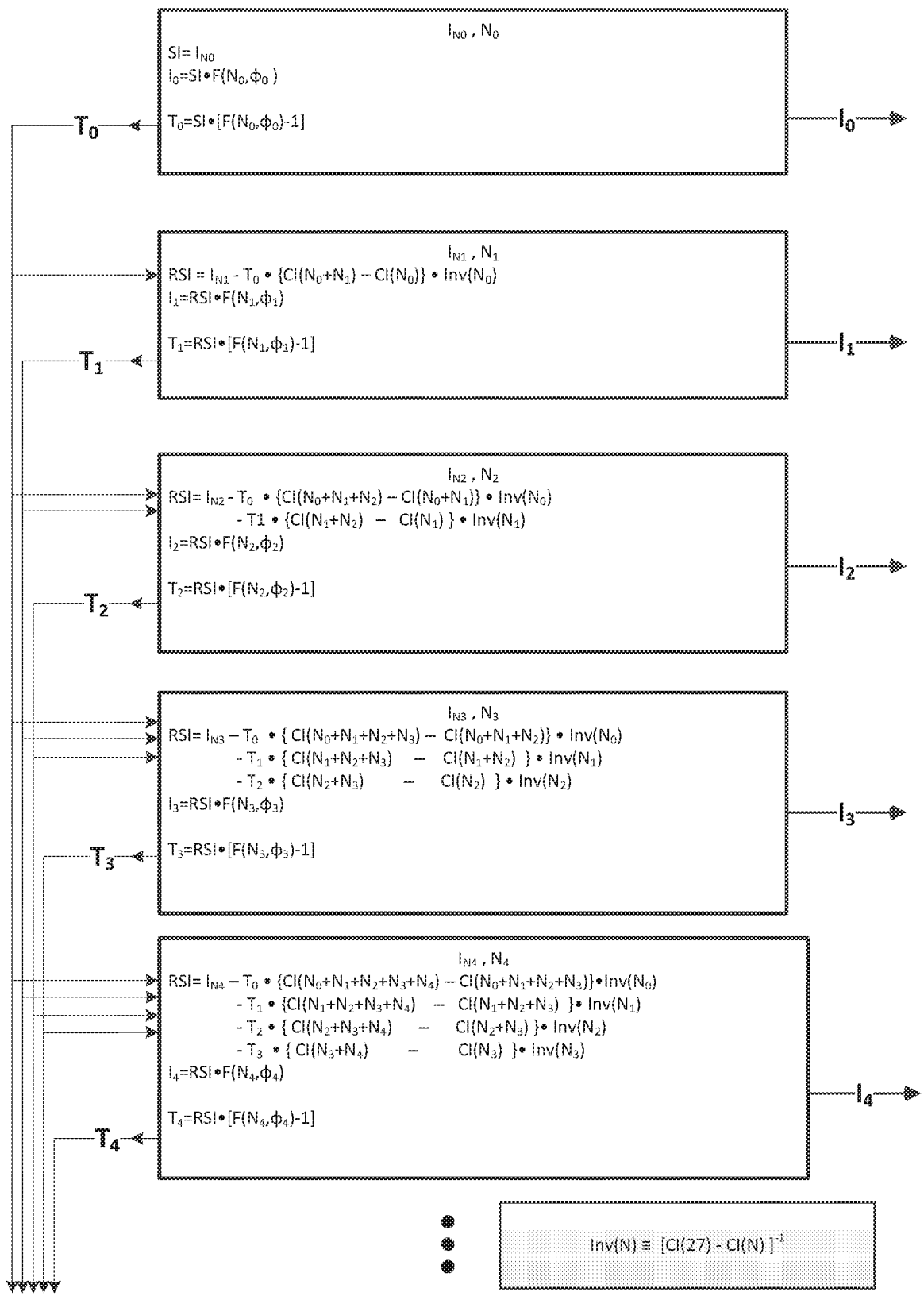
FIG. 19 illustrates a process according to some embodiments.

FIG. 19 illustrates another implementation according to some embodiments. According to FIG. 19, each block also determines the energy associated with each "standard" tail of each corrected pulse. Generally, T #=RSI #*[F(N #,Φ#)-1]. The standard tails are passed to each subsequent block to assist in the determination of the energies associated with overlapping pulses (e.g., RSI1=IN1-T0*{CI(N0+N1)-CI(N0)}*Inv(N0), where Inv(N0)=[CI(27)-CI(N)]-1). As in FIG. 18, the cumulative integral determinations are not phase-dependent in FIG. 19 but embodiments may include phase-dependent cumulative integral determinations.

Figure 20:
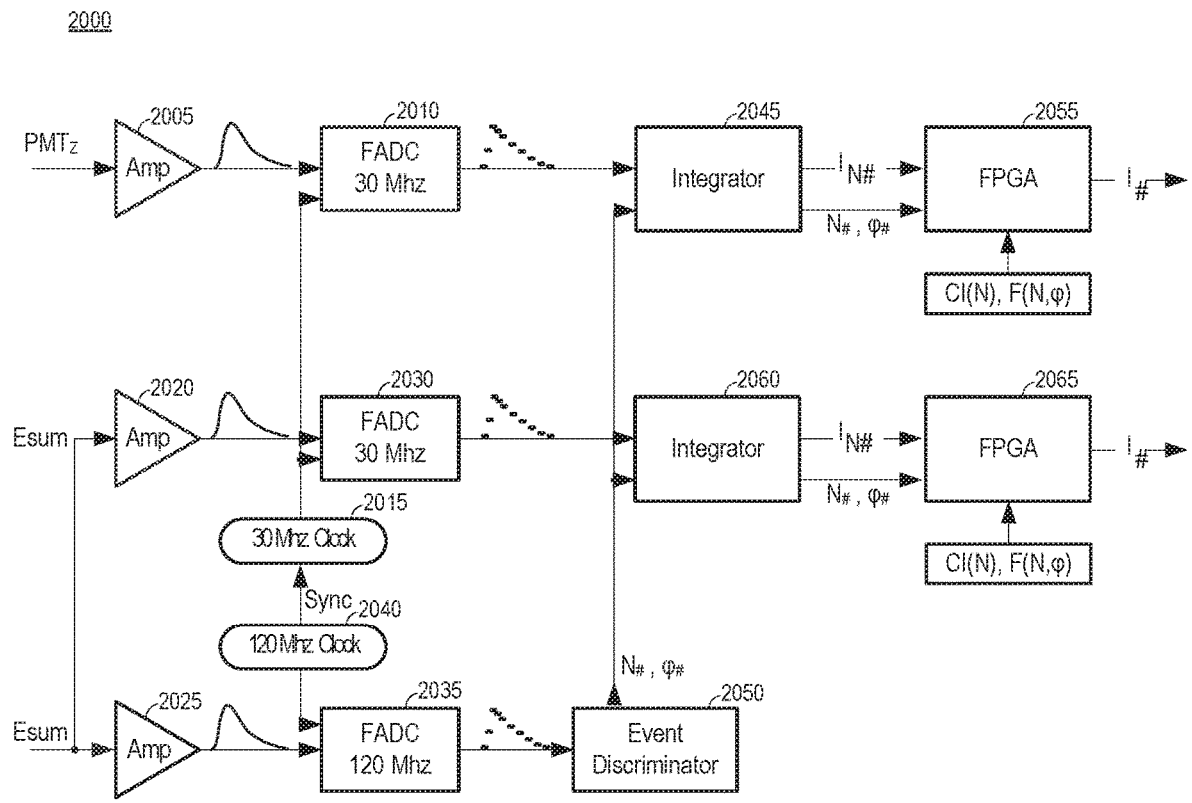
FIG. 20 is a functional block diagram of a system to implement a process according to some embodiments.

FIG. 20 is a block diagram of system 2000 to implement process 400 for the Esum and one PMT channel according to some embodiments. System 2000 may comprise an implementation of signal processing unit 16 of FIG. 1 according to some embodiments. System 2000 may include additional components, and embodiments may include components other than those shown in FIG. 20.

Amplifier 2005 receives a Z (energy)-channel signal from a PMT, which is sampled by FADC 2010 based on 30 MHz clock 2015. Similarly, amplifiers 2020 and 2025 receive an Esum signal from all the PMTs, which are sampled by FADC 2030 and FADC 2035, respectively, based on 30 MHz clock 2015 and 120 MHz clock 2040, which is synchronized with 30 MHz clock 2015.

As described above, samples generated by FADC 2010 are integrated by integrator 2045 to determine a short integral $I_{N\;\#}$. Integrator 2045 also provides the number of samples N and a phase of the incoming pulse (which are received from event discriminator 2050) to FPGA 2055, which determines corrected pulse $I_{\#}$ by determining a constant $F(N,\phi)$ and multiplying the constant by the short integral $I_{N\;\#}$ as described with respect to S425. Similarly, integrator 2060 provides the number of samples N and a phase of an incoming $E_{sum}$ pulse (which are also received from event discriminator 2050) to FPGA 2065, which determines a corrected pulse $I_{\#}$ by determining a constant $F(N,\Phi)$ and multiplying the constant by the corresponding short integral $I_{N\;X\;\#}$.

Those in the art will appreciate that various adaptations and modifications of the above-described embodiments can be configured without departing from the scope and spirit of the claims. Therefore, it is to be understood that the claims may be practiced other than as specifically described herein.

What is claimed is:
1. A system comprising:
 a scintillator to receive radiation and to generate a plurality of light photons in response to reception of the radiation;
 a light sensor to receive light photons and to generate an electrical signal in response to reception of the light photon; and
 a processing unit to:
  receive the electrical signal from the light sensor, the received electrical signal comprising a first pulse, a second pulse overlapping the first pulse at a first time and a third pulse overlapping, the first pulse and the second pulse at a second time;
  determine a first integral over a first number of samples of the electrical signal to the first time;
  determine an estimated energy of the first pulse based on the first integral;
  determine a second estimated energy of the first pulse from the first time to the second time based on the estimated energy of the first pulse;
  determine a residual short integral of the second pulse by subtracting the second estimated energy of the first pulse from the second integral;
  determine an estimated energy of the second pulse based on the residual short integral of the second pulse;

determine a third integral over a third number of samples of the electrical signal from the second time to a third time;

determine a third estimated energy of the first pulse from the second time to the third time based on the estimated energy of the first pulse;

determine a second estimated energy of the second pulse from the second time to the third time based on the estimated energy of the second pulse;

determine a residual short integral of the third pulse by subtracting the third estimated energy of the first pulse and the second estimated energy of the second pulse from the third integral; and determine an estimated energy of the third pulse based on the residual short integral of the third pulse.

2. A system according to claim 1, wherein determination of the estimated energy of the first pulse based on the first integral comprises:

determination of a pulse energy ratio of a pulse energy over a default number of samples to a pulse energy over the first number of samples; and determination of the estimated energy of the first pulse based on the first integral and the pulse energy ratio.

3. A system according to claim 1, wherein determination of an estimated energy of a first pulse based on the first integral comprises:

determination of a pulse energy ratio of a pulse energy over a default number of samples to a pulse energy over the first number of samples; and determination of the estimated energy of the first pulse based on the first integral and the pulse energy ratio.

4. A system according to claim 1, wherein determination of the second estimated energy of the first pulse from the second time to the third time comprises:

determination of a cumulative pulse integral corresponding to a pulse portion between the first time and the second time; and multiplication of the cumulative pulse integral by the estimated energy of the first pulse.

5. A system according to claim 2, wherein determination of the estimated energy of the second pulse based on the residual short integral of the second pulse comprises:

determination of a second pulse energy ratio of the pulse energy over the default number of samples to a pulse energy over the second number of samples; and determination of the estimated energy of the second pulse based on the residual short integral and the second pulse energy ratio.

6. A system according to claim 2, wherein determining the second estimated energy of the first pulse from the first time to the second time comprises:

determination of a cumulative pulse integral corresponding to a pulse portion between the first time and the second time; and multiplication of the cumulative pulse integral by the estimated energy of the first pulse, wherein determination of the third estimated energy of the first pulse from the second time to the third time comprises:

determination of a second cumulative pulse integral corresponding to a pulse portion between the second time and the third time; and multiplication of the second cumulative pulse integral by the estimated energy of the first pulse, wherein determination of a second estimated energy of the second pulse from the second time to the third time comprises:

determination of a third cumulative pulse integral corresponding to a pulse portion from the second time to the third time; and multiplication of the third cumulative pulse integral by the estimated energy of the second pulse.

7. A system according to claim 3, further comprising:

a sampling system to determine a phase of the first pulse, wherein determination of the pulse energy ratio comprises determination of a ratio of a pulse energy over the default number of samples to a pulse energy over the first number of samples and at the phase of the first pulse.

8. A system according to claim 3, wherein determination of the estimated energy of the second pulse based on the residual short integral of the second pulse comprises:

determination of a second pulse energy ratio of a pulse energy over a default number of samples to a pulse energy over the second number of samples; and determination of the estimated energy of the second pulse based on the residual short integral of the second pulse and the second pulse energy ratio.

9. A system according to claim 8, wherein determination of the second estimated energy of the first pulse from the first time to the second time comprises:

determination of a cumulative pulse integral corresponding to a pulse portion between the first number of samples and the first total number of samples; and multiplication of the cumulative pulse integral by the estimated energy of the first pulse.

10. A method comprising:

receiving an electrical signal comprising a first pulse, a second pulse overlapping the first pulse at a first time, and a third pulse overlapping the first pulse and the second pulse at a second time;

determining a first integral over a first number of samples of the electrical signal to the first time;

determining an estimated energy of the first pulse based on the first integral;

determining a second integral over a second number of samples of the electrical signal from the first time to the second time;

determining a second estimated energy of the first pulse from the first time to the second time based on the estimated energy of the first pulse;

determining a residual short integral of the second pulse by subtracting the second estimated energy of the first pulse from the second integral; and determining an estimated energy of the second pulse based on the residual short integral of the second pulse;

determining a third integral over a third number of samples of the electrical signal from the second time to a third time;

determining a third estimated energy of the first pulse from the second time to the third time based on the estimated energy of the first pulse;

determining a second estimated energy of the second pulse from the second time to the third time based on the estimated energy of the second pulse;

determining a residual short integral of the third pulse by subtracting the third estimated energy of the first pulse and the second estimated energy of the second pulse from the third integral; and determining an estimated energy of the third pulse based on the residual short integral of the third pulse.

11. A method according to claim 10, wherein determining an estimated energy of the first pulse based on the first integral comprises:

determining a pulse energy ratio of a pulse energy over a default number of samples to a pulse energy over the first number of samples; and determining the estimated energy of the first pulse based on the first integral and the pulse energy ratio.

12. A method according to claim 10, wherein determining an estimated energy of a first pulse based on the first integral comprises:

determining a pulse energy ratio of a pulse energy over a default number of samples to a pulse energy over the first number of samples; and determining the estimated energy of the first pulse based on the first integral and the pulse energy ratio.

13. A method according to claim 10, wherein determining the second estimated energy of the first pulse comprises:

determining a cumulative pulse integral corresponding to a pulse portion between the first time and the second time; and multiplying the cumulative pulse integral by the estimated energy of the first pulse, wherein determining the third estimated energy of the first pulse comprises:

determining a second cumulative pulse integral corresponding to a pulse portion between the second time and the third time, and multiplying the second cumulative pulse integral by the estimated energy of the first pulse, and wherein determining a second estimated energy of the second pulse comprises:

determining a third cumulative pulse integral corresponding to a pulse portion between the second time and the third time; and multiplying the third cumulative pulse integral by the estimated energy of the second pulse.

14. A method according to claim 11, wherein determining the estimated energy of the second pulse based on the residual short integral of the second pulse comprises:

determining a second pulse energy ratio of the pulse energy over the default number of sample to a pulse energy over the second number of samples; and determining the estimated energy of the second pulse based on the partial integral and the second pulse energy ratio.

15. A method according to claim 11, wherein determining the second estimated energy of the first pulse comprises:

determining a cumulative pulse integral corresponding to a pulse portion between the first time and the second time; and multiplying the cumulative pulse integral by the estimated energy of the first pulse, wherein determining the third estimated energy of the first pulse comprises:

determining a second cumulative pulse integral corresponding to a pulse portion between the second time and the third time; and multiplying the second cumulative pulse integral by the estimated energy of the first pulse, and wherein determining a second estimated energy of the second comprises:

determining a third cumulative pulse integral corresponding to a pulse portion between the second time and the third time; and multiplying the third cumulative pulse integral by the estimated energy of the second pulse.

16. A method according to claim 12, further comprising:

determining a phase of the first pulse, wherein determining the pulse energy ratio comprises determining the pulse energy ratio of the pulse energy over the default number of samples to a pulse energy over the first number of samples and at the phase of the first pulse.

17. A method according to claim 12, wherein determining the estimated energy of the second pulse based on the residual short integral of the second pulse comprises:

determining a second pulse energy ratio of the pulse energy over the default number of samples to a pulse energy over the second number of samples; and determining the estimated energy of the second pulse based on the residual short integral of the second pulse and the second pulse energy ratio.

18. A method according to claim 17, wherein determining the second estimated energy of the first pulse comprises:

determining a cumulative pulse integral corresponding to a pulse portion between the first time and the second time; and multiplying the cumulative pulse integral by the estimated energy of the first pulse.

* * * * *